H. W. BROWN.
ELECTRICAL MEASURING INSTRUMENT.
APPLICATION FILED DEC. 19, 1913.

1,274,675.

Patented Aug. 6, 1918.

WITNESSES:

INVENTOR
Harold W. Brown
BY
Wesley G. Carr
ATTORNEY

UNITED STATES PATENT OFFICE.

HAROLD W. BROWN, OF ITHACA, NEW YORK, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,274,675.

Specification of Letters Patent. Patented Aug. 6, 1918.

Application filed December 19, 1913. Serial No. 807,707.

*To all whom it may concern:*

Be it known that I, HAROLD W. BROWN, a citizen of the United States, and a resident of Ithaca, in the county of Tompkins and State of New York, have invented a new and useful Improvement in Electrical Measuring Instruments, of which the following is a specification.

My invention relates to electrical measurement instruments and particularly to volt-ampere-hour meters.

The object of my invention is to provide a device of the above-indicated character that comprises a watthour meter having its armature so damped or retarded in accordance with the power factor of the circuit to which it is connected as to indicate volt-ampere hours.

It has been determined that, where water power is employed, it is substantially as cheap to generate electrical energy at one power factor as another. In such cases, it frequently becomes necessary to measure the energy in terms of volt-ampere hours instead of watthours. To meet the demand for a meter of the above indicated character, I provide a watthour meter, the armature of which I cause to be damped or retarded in accordance with the power factor of the circuit, to which it is connected, thereby securing indications of volt-ampere hours.

Figure 1:
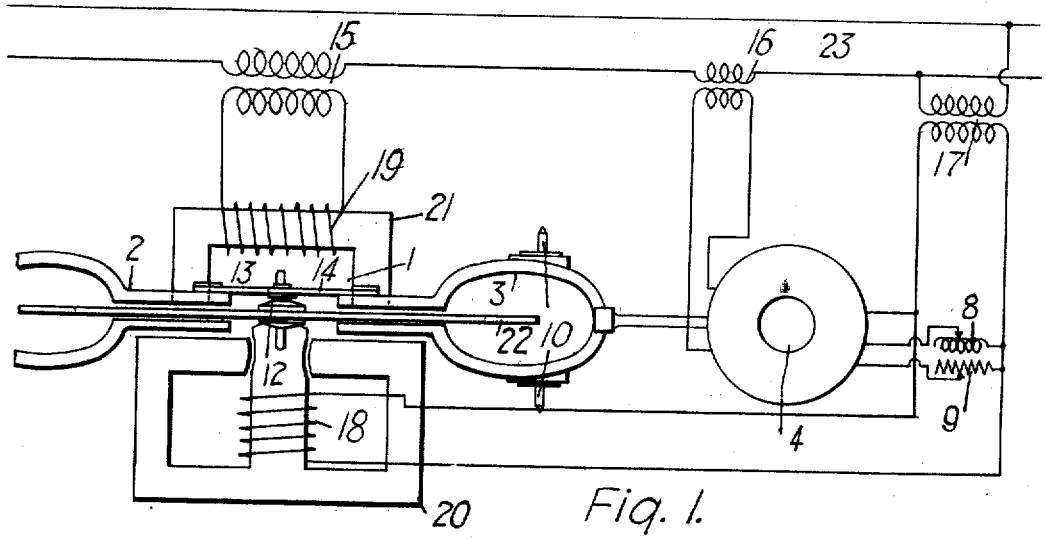
Figure 2:
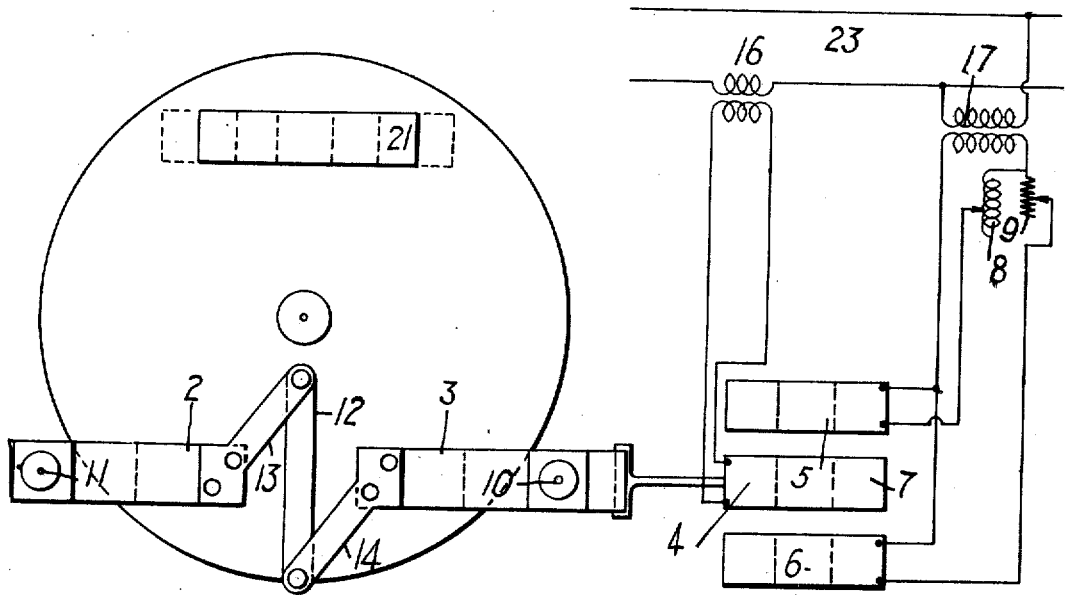

In the accompanying drawings, Figures 1 and 2 are diagrammatic elevational and plan views, respectively, of a volt-ampere hour meter embodying my invention.

A watthour meter 1 is connected to an electric circuit 23 and its movable armature 22 is damped or retarded by permanent damping magnets 2 and 3. A power-factor meter 4, comprising two stationary potential windings 5 and 6 and a movable current winding 7, is operatively connected to the circuit 23 and adapted to adjust the position of the damping magnets 2 and 3 in accordance with the power factor of the circuit.

Current is supplied to the winding 7 through a transformer 16 and to the windings 5 and 6 through a transformer 17. A variable reactor 8 is connected in circuit with the winding 5, and a variable resistor 9 is connected in circuit with the winding 6.

The watthour meter 1 comprises two stationary magnetizable core members 20 and 21 upon which are disposed potential and current windings 18 and 19, respectively. The windings 18 and 19 are connected to the circuit 23 through potential and current transformers 17 and 15, respectively. The damping magnets 2 and 3 are pivotally mounted at points 11 and 10, respectively, and are operatively connected together by a link 12 and arms 13 and 14.

The watthour meter 1 may be of any well known construction, and the power-factor meter 4 may be constructed along the lines of the meters covered by U. S. Patents Nos. 679,174 and 679,175. The essential features of my invention are that the positions of the damping magnets are so varied in accordance with the power factor that they assume such positions for a condition of unity power factor as to exert their largest drag on the armature 22 and such positions at zero power factor as to exert substantially no drag on the armature 22.

By properly proportioning the windings of the power-factor meter, the damping magnets 2 and 3 may be caused to assume the correct position with respect to the armature 22 to exert a drag on the same that is proportional to the power factor. The forward torque of the watt-hour meter is proportional to the watts, and the backward drag, at a given power factor, is proportional to the speed, as is the case in all watthour meters, and the backward drag at different power factors is proportional to the power factor. The speed will become such that the backward and forward torques are equal to each other, and there is a condition of equilibrium established. Under that condition, speed is proportional to watts divided by power factor, which is equivalent to volt-amperes.

When it becomes necessary to measure the volt-ampere hour output of a circuit 23, the watt-meter windings are connected in the usual way, as in the case shown; the voltage winding 18 is connected to the transformer 17 and the current winding 19 to the current transformer 15. The windings 18 and 19 induce a shifting magnetic flux in the air gap between the cores 20 and 21 that causes the armature 22 to rotate in accordance with the watts traversing the circuit 23. At unity power factor, substantially the same current traverses the winding 5 as traverses the winding 5 of the power-factor meter. However, since the circuit including the winding 5 is highly inductive, the current that traverses the two windings will be substantially 90° out of phase. At unity power factor, the current that traverses the winding 6 is substantially in phase with the current that traverses the winding 7. These windings are so disposed that one repels the other. The winding 5, having a current in quadrature with that in the windings 6 and 7, at unity power factor, neither attracts nor repels the winding 7, hence, the winding 7 moves toward the winding 5, but, if the phase relation of the current in the winding 7 changes, the reaction between the windings 6 and 7 decreases and that between the windings 5 and 7 increases, to cause the permanent magnets 2 and 3 to travel towards the center of the armature when the power factor approaches zero, as hereinbefore described. To prevent the motion of the armature 22 from deflecting the magnets from their proper position, the two permanent magnets are so connected that one tends to rotate inwardly while the other tends to rotate outwardly, thus neutralizing the rotative effect imparted to them by the rotating armature 22.

Since, within the commercial range of power-factor, the same seldom, if ever drops below 40%, and, consequently, the change in the drag due to the decreased lever arm of the applied dragging or retarding force will be sufficient to cause the armature 22 to turn in accordance with the volt-amperes traversing the circuit 23.

Integrating mechanism may be applied as in any watt-hour meter, and other modifications in the construction of my invention may be made by those skilled in the art which will not depart from the scope of same, as set forth in the appended claims.

I claim as my invention:

1. In an electrical measuring instrument, the combination with a means of measuring energy, or a phase-responsive means actuated in accordance with the phase relation of the current and voltage of the energy to be measured, and means actuated by said phase-responsive means for controlling the speed of said energy-measuring means.

2. In a volt-ampere hour measuring instrument, the combination with a watt-hour meter, of a power-factor meter, and means actuated by said power-factor meter for controlling the speed of said watt-hour meter.

3. In an electrical measuring instrument, the combination with a watt-hour meter, of means for determining the phase relation of the current and voltage in a circuit, and damping magnets for said watt-hour meter, the position of said damping magnets being governed by said phase-determining means.

4. In an electrical measuring instrument, the combination with a watt-hour meter, of a power-factor meter, and a plurality of damping magnets for said watt-hour meter, said damping magnets being operatively connected to the power-factor meter and adapted to assume positions corresponding to the power factor.

5. A meter for an electric circuit comprising an armature, means for applying an actuating force to the armature to cause it to have a forward torque in accordance with the power traversing the circuit, and means for applying a retarding force to the armature to cause it to have a retarding torque in accordance with the power-factor of the circuit.

6. In a volt-ampere hour meter, the combination with a power-measuring device, of means for damping the motion of said power-measuring device in proportion to the power factor of the power being measured.

7. In a volt-ampere hour meter, the combination with a power-measuring instrument, two damping magnets for said instrument, means for so connecting said damping-magnets that the rotation of the armature of said power-measuring instrument does not offset the position of said magnets, and a power-factor meter for controlling the position of said damping magnets with respect to the armature of said power-measuring instrument.

8. In a volt-ampere meter, the combination with a power-measuring device, of means for retarding the motion of said power-measuring device in accordance with the power factor of the power being measured.

9. In a meter for an electric circuit, the combination with an armature and means for actuating the armature, of phase responsive means for so retarding the armature that its resultant movement varies in accordance with the apparent power traversing the circuit.

10. A meter for an electric circuit comprising an armature, means for actuating the armature, phase-responsive means and a damping magnet actuated by the phase-responsive means for so retarding the armature that it is actuated in accordance with the apparent power traversing the circuit.

In testimony whereof, I have hereunto subscribed my name this 28th day of November 1913.

HAROLD W. BROWN.

Witnesses:
 FRED L. CLARK,
 D. C. PROCTOR.